(12) United States Patent
Page et al.

(10) Patent No.: US 8,211,303 B2
(45) Date of Patent: *Jul. 3, 2012

(54) WATER TREATMENT APPARATUS AND METHOD

(75) Inventors: Jason W. Page, Grand Prairie (CA); Carrie A. Page, Grand Prairie (CA)

(73) Assignee: JC Environmental Inc., Charlie Lake (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,210

(22) Filed: Jan. 5, 2011

(65) Prior Publication Data

US 2011/0108471 A1    May 12, 2011

Related U.S. Application Data

(63) Continuation of application No. 11/627,310, filed on Jan. 25, 2007.

(60) Provisional application No. 60/794,645, filed on Apr. 25, 2006.

(51) Int. Cl.
*B01D 21/24* (2006.01)

(52) U.S. Cl. ........ 210/262; 210/104; 210/121; 210/182; 210/259; 210/513

(58) Field of Classification Search ............. 210/182, 210/322, 167.07, 119, 121, 125, 126, 128, 210/117, 123, 124, 104, 259, 262, 513; 159/20.2, 159/28.1, 4.01, 4.02, 16.3, 34, 37, 38, 36, 159/44, 43.1, DIG. 25, DIG. 41
See application file for complete search history.

(56) References Cited

U.S. PATENT DOCUMENTS

| 2,066,348 | A | | 1/1937 | Hays | |
| 2,643,974 | A | * | 6/1953 | Abraham | 202/163 |
| 3,860,492 | A | | 1/1975 | Lowi, Jr. et al. | |
| 4,172,767 | A | | 10/1979 | Sear | |
| 4,308,136 | A | * | 12/1981 | Warne, Jr. | 210/114 |
| 4,534,828 | A | | 8/1985 | Erickson et al. | |
| 4,779,677 | A | * | 10/1988 | Cobb | 166/79.1 |
| 4,804,477 | A | * | 2/1989 | Allen et al. | 210/737 |

(Continued)

FOREIGN PATENT DOCUMENTS

CA        2112104 C    12/1992

(Continued)

OTHER PUBLICATIONS

Restriction Requirement for U.S. Appl. No. 11/627,310, mailed Jun. 30, 2010.

(Continued)

*Primary Examiner* — Tony G Soohoo
*Assistant Examiner* — David C Mellon
(74) *Attorney, Agent, or Firm* — Schwabe, Williamson & Wyatt, P.C.

(57) ABSTRACT

A mobile wastewater separator and recover unit and method for the separation and disposal/recovery of waste water for example in the oil and gas industry. It is fully self-contained and maintains the ability to separate heavy solids, floating contaminants, and water for recovery and reuse or disposal as required. Main components of the system are a large wastewater holding capacity implementing various compartments & separator/recovery mechanisms, evaporation compartments that are interchangeable for efficiency in both warm & extreme cold temperature operations, and finally a condensation recovery system and clean water holding compartment.

12 Claims, 3 Drawing Sheets

U.S. PATENT DOCUMENTS

| | | | |
|---|---|---|---|
| 4,880,533 A | 11/1989 | Hondulas | |
| 4,946,558 A | 8/1990 | Salmon | |
| 4,995,460 A * | 2/1991 | Strahan | 166/267 |
| 5,082,525 A | 1/1992 | Travis | |
| 5,381,742 A | 1/1995 | Linton et al. | |
| 5,525,213 A | 6/1996 | Phillips | |
| 5,582,680 A | 12/1996 | VanKouwenberg et al. | |
| 5,609,733 A * | 3/1997 | Burton | 203/10 |
| 5,730,878 A | 3/1998 | Rice | |
| 5,738,761 A | 4/1998 | Fletcher | |
| 5,772,843 A | 6/1998 | Rhodes | |
| 5,940,578 A | 8/1999 | Goddard | |
| 6,371,058 B1 | 4/2002 | Tung | |
| 6,637,379 B2 | 10/2003 | Hays et al. | |
| 6,733,636 B1 | 5/2004 | Heins | |
| 6,887,344 B1 | 5/2005 | VanKouwenberg | |
| 6,971,238 B1 | 12/2005 | Walker | |
| 2006/0010865 A1 | 1/2006 | Walker | |

FOREIGN PATENT DOCUMENTS

| | | |
|---|---|---|
| CA | 2408324 A1 | 11/2001 |
| CA | 2531870 A1 | 7/2006 |
| CA | 2535672 A1 | 8/2007 |
| CA | 2554471 A1 | 8/2007 |
| WO | 9857891 A1 | 12/1998 |

OTHER PUBLICATIONS

Restriction Requirement for U.S. Appl. No. 11/627,310, mailed Sep. 30, 2010.

Office Action, issued in U.S. Appl. No. 11/627,310, mailed Mar. 15, 2011, 6 pages.

Office Action, issued in U.S. Appl. No. 11/627,310, mailed Jul. 6, 2011, 8 pages.

Office Action, issued in U.S. Appl. No. 11/627,310, mailed Jan. 23, 2012, 5 pages.

* cited by examiner

WATER TREATMENT APPARATUS AND METHOD

CROSS-REFERENCE TO RELATED APPLICATIONS

This application claims priority under 35 U.S.C. 119(e) from U.S. Provisional Application No. 60/794,645 filed on Apr. 25, 2006 and is a continuation of U.S. patent application Ser. No. 11/627,310 filed Jan. 25, 2007.

BACKGROUND

Containment, transportation, and disposal of drilling waste is expensive. Spills are a common occurrence in operations and are not only very expensive for the operator in lost product but are detrimental to the environment. Various systems have been proposed for waste water treatment, for example at well drilling sites, but there is room for improvement on them.

SUMMARY

There is provided an apparatus for waste water treatment. In one embodiment, the waste water treatment apparatus comprises a platform, such as a skid, a phase separation tank, an evaporation tank with condenser and clean water recovery tank mounted together on the platform with fluid transfer mechanisms interconnecting the tanks. The phase separation tank may provide three phase separation into solids, water and an oil fraction. The evaporation portion of the apparatus may be provided by interchangeable summer and winter evaporation tanks. The evaporation tanks may be provided with a steam hood. Fluid transfer between the separation and evaporation tank may pass through a transitional tank such as a floe tank. A method for the seasonal treatment of waste water is also provided.

BRIEF DESCRIPTION OF THE DRAWINGS

There will now be described embodiments of a waste water treatment apparatus by way of illustration, with reference to the drawings, in which like reference characters denote like elements, and in which.

DETAILED DESCRIPTION

Figure 1:
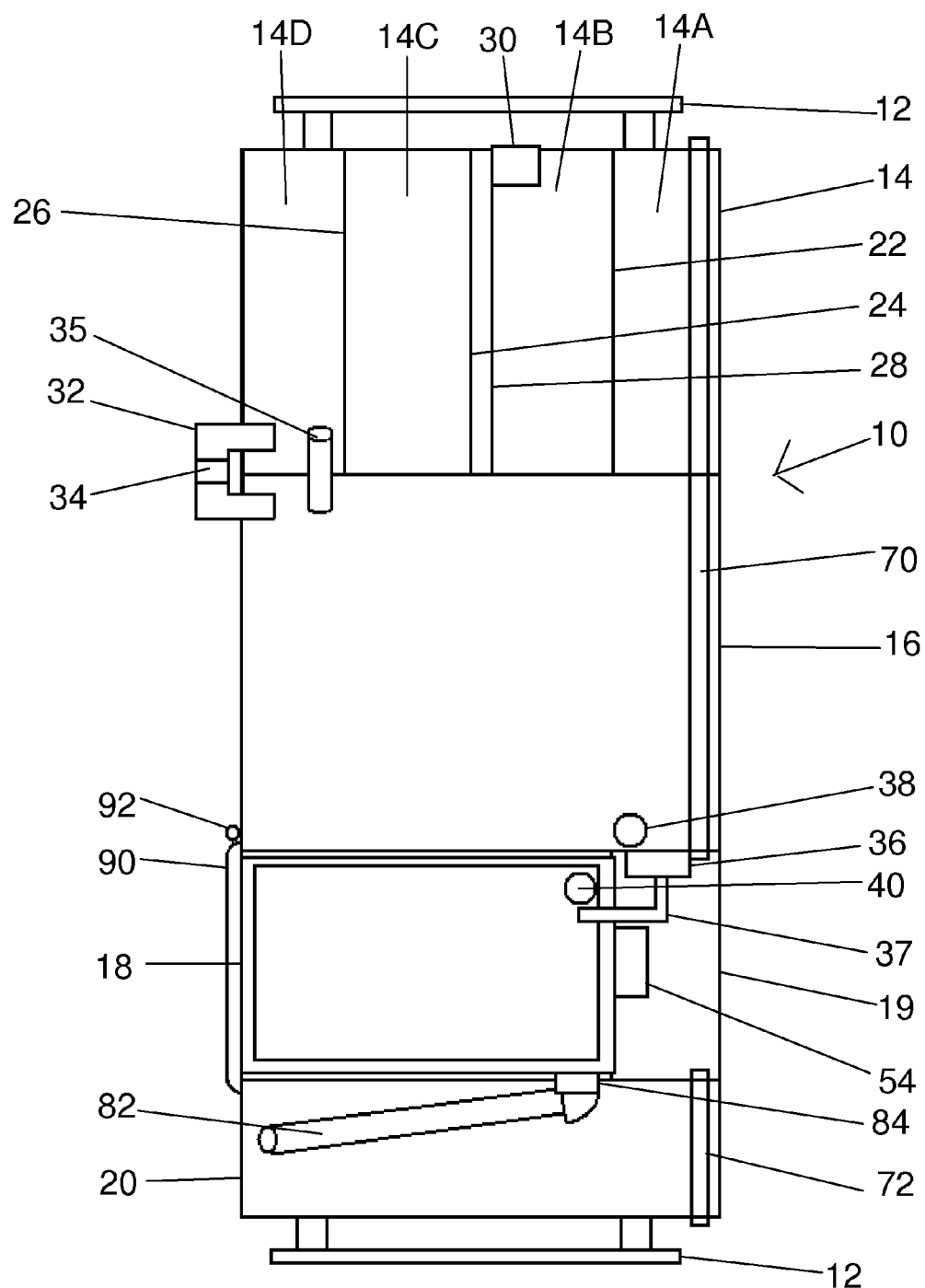
FIG. 1 is a top view of a waste water treatment apparatus.

In FIG. 1 an apparatus 10 for waste water treatment includes a supporting platform 12, which could be a skid, and a phase separation tank 14, transitional tank 16, evaporation tank 18 and clean water recovery tank 20 mounted together on the platform 12. By using a skid for mounting the tanks 14, 16, 18 and 20, the apparatus 10 is made mobile. The phase separation tank 14 is used as an entry point for waste water, such as drilling waste and spillage fluids. For remote locations, a fuel tank and generator may also be mounted on the platform 12 to provide necessary power.

The phase separation tank 14 may provide for solids separation by using a series of graduated plates. Solids may include heavy solids such as sand, sawdust, clay and gravel. The incoming waste water is delivered to compartment 14A of phase separation tank 14. The waste water passes from compartment 14A to compartment 14B over a floor plate 22 that catches larger solids. The waste water then passes over a second floor plate 24 into compartment 14C and then over a third floor plate 26 into compartment 14D. The floor plates 22, 24, 26 together comprise a series of graduated floor plates that catch solids on the floor of the tank 14. For example, plate 22 may be a 6 inch floor plate extending across the tank bottom, and plates 24 and 26 may be 12 inch floor plates.

A skimmer plate 28 is provided in an upper portion of the tank 14 to contain floating contaminants such as oils, solvents, detergents, and oil based drilling fluids, and a skimmer 30, such as a Maxi-Skimmer™ is provided on the tank 14 to collect and recover the floating contaminants. A flow line 32, for example piping, with a ball valve 34, leads from tank 14 to tank 16. The flow line 32 may be at a relatively high level for flow of fluids under gravity from tank 14 to tank 16, but may also be operated at a relatively low level, but above the plate 26, and used in cooperation with a high flow line 35 that extends from tank 14 to tank 16. Filters may be provided in each of flow line 32 and flow line 35. In normal operation, fluid drains by gravity from tank 14 to tank 16. For this reason, a relatively high flow line should be used to ensure that tank 16 fills. But in order to drain tank 14 for subsequent removal from a remote site, tank 14 should also be provided with a low flow line, that is normally closed, but may be opened, such as by using ball valve 34 to drain tank 14. The low flow line 32 may be for example 12 inches off the floor of the tank 14, and the high flow line 35 may be for example four feet off the floor of the tank 14. The plates 22, 24, 26 help keep solids away from the flow lines 32, 35. Various filters may be used instead of plates 22, 24 or 26. At the conclusion of use at a remote site, the solids in the tank 14 may be removed using for example a vacuum truck.

The flow lines 32 and 35 thus transfer fluids, for example by gravity, from tank 14 to tank 16. The tank 16 may be operated as a floe tank, to which a chemical flocculant may be added if required for further clarification of fluid. However, the tank 16 may simply be used for additional settling of solids, or omitted if solids separation and filtering in the tank 14 is sufficient to produce clarified fluid for the evaporation tank 18.

A conduit system 36, which may be provided with a feed pump such as an electric pump, leads clarified fluids from the tank 16 to tank 18 through evaporation tank supply line 37. The supply line 37 constitutes a fitting provided on the platform 12 for supplying waste water to the tank 18. Tank 18 is installed at location 19 on the platform and may be one of two inter-changeable evaporation tanks. A summer boil-off tank insert is shown in FIG. 1. Control of the supply of waste water to tank 18 from tank 16 is provided by a float operated switch 38 located inside tank 16 and float operated switch 40 located outside tank 18 in a float box 41. The conduit system 36 includes valves (not shown) that are responsive to the float operated switches 38 and 40 to manipulate the source water from tank 16. The float operated switch in tank 16 operates in a low level detection mode. When fluid in the tank 16 is below a set level, the apparatus 10 is turned off, with no evaporation, and no pumping of fluids. When fluid in the tank 16 is above a set level, the conduit system 36 and its feed pump are turned on to supply fluid to tank 18. When fluid in the tank 18 reaches a set low level, the level is detected by a float operated switch 40 and the feed pump 36 for tank 18 is turned on. When fluid in the tank 18 reaches a set high level, the float inside the float box 40 detects this high level and turns off fluid transfer into the tank 18. An additional float (not shown) is also in the float box 40 which signals the burner to fire when its low water level is reached. The burner will continue to fire as long as the float in tank 16 is above its low water level and the low level switch for the burner in the float box 40 is above its low water level. This additional float offers another safety mechanism to signal the burner to shut down due to low water and thus saving damage to the piping and combustion chamber. The flow lines 32, 35, transitional tank 16 and conduit system 36 together constitute a fluid transfer system for moving fluid from separation tank 14 to tank 18. Other methods for providing clarified fluid to the evaporation tank 18 may be used.

Figure 2:
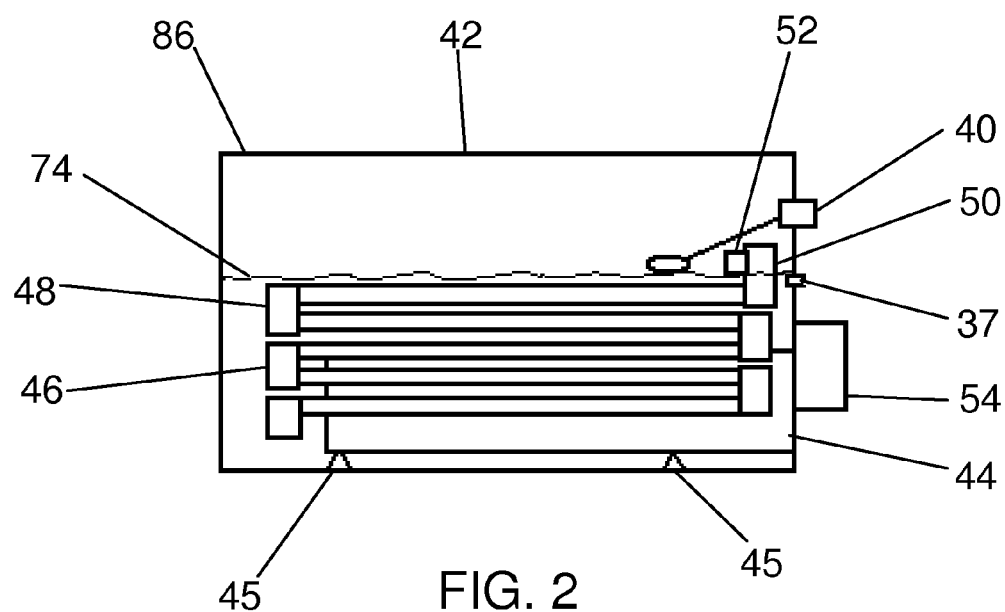
FIG. 2 is side view of a summer evaporator for use with the apparatus of FIG. 1.

Tank 18 may be one of two interchangeable evaporation tanks, one of which is illustrated in FIG. 2. FIG. 2 shows a warm temperature/summer time tank 42, which is preferably an insulated boil-off tank. A burner chamber 44 is provided inside the tank 42 that is supported off the floor of tank 42 by burner legs 45. Hot exhaust gases are provided from the burner 54 through exhaust piping 46, 48 which make multiple passes through the tank 42 and reconnects at an exhaust manifold 50. Exhaust air may be blown across the surface of the boiling water from the exhaust manifold 50 as illustrated by exhaust outlet 52. The heat source is a burner 54 mounted on the exterior of the summer tank 42. Fuel for the burner 54 may include but is not exclusive to available sources such as diesel, natural gas, or propane.

Figure 3:
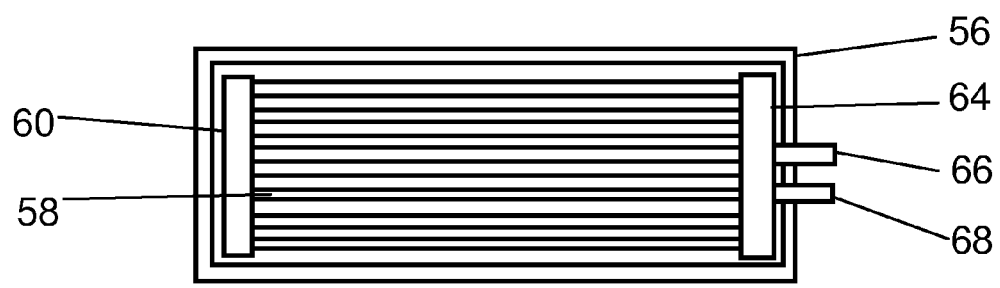
FIG. 3 is a top view of a winter evaporator for use with the apparatus of FIG. 2.
Figure 4:
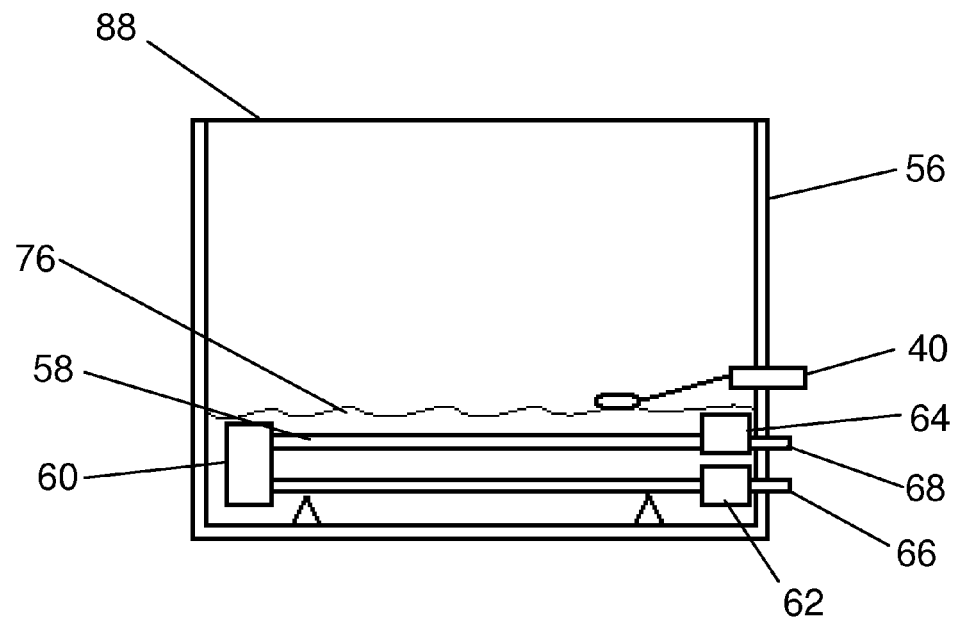
FIG. 4 is a side view of a winter evaporator for use with the apparatus of FIG. 2.
Figure 5:
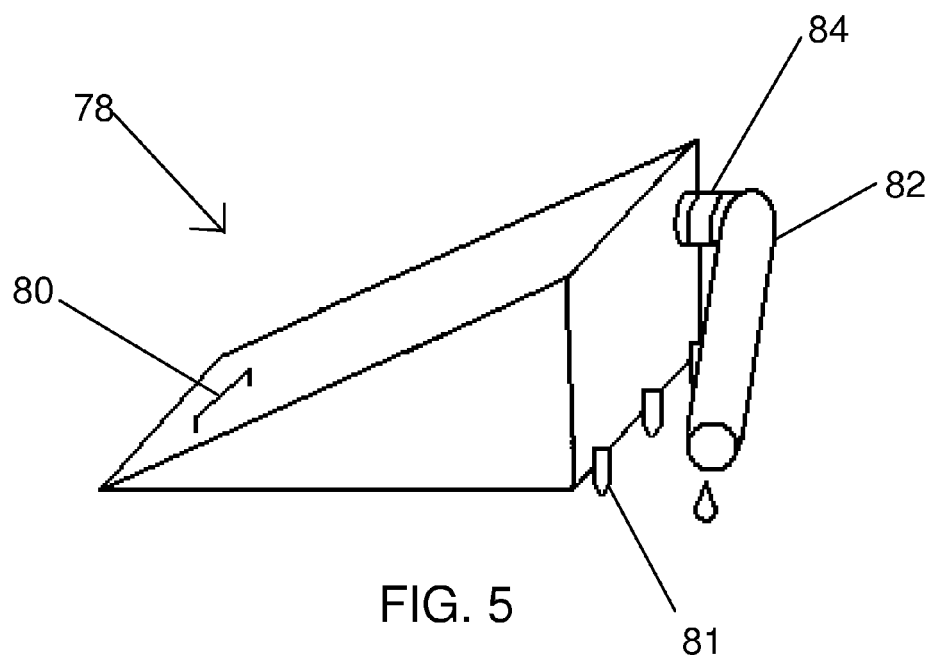
FIG. 5 is a perspective view of a steam hood with condenser jacket for use with the apparatus of FIG. 1.

Tank 42 may be interchanged with a winter evaporation tank 56 illustrated in FIGS. 3 and 4 and connected to the supply line 70 from tank 16 (FIG. 1). Again, the tank 56 is preferably an insulated boil-off tank installed at location 19, and includes a series of steam lines 58 that run through the inside of the tank 56 between a series of steam manifolds 60, 62 and 64. Manifold 62 is a steam injection manifold supplied from steam inlet 66. Manifold 64 collects the steam from steam lines 58 and supplies it to outlet 68.

Steam is supplied to steam inlet 66 through supply line 70 that runs through tanks 14 and 16 for pre-heating of fluids. When the tank 56 is installed in the apparatus 10, the inlet 66 is connected to the supply line 70. However, when the summer evaporator 42 is installed in apparatus 10, the line 70 is disconnected. When tank 56 is installed in the apparatus 10, the steam outlet 68 is connected to line 72, which continues through clean water tank 20 to help prevent freezing of clean water in tank 56. Float operated switches 40 are used in each of the tanks 42 and 56 to control conduit system 36, which includes a feed pump, to ensure that water is kept near a pre-determined level 74, 76 in tanks 42, 56 respectively. Since the tanks 42, 56 are used to boil water, it is necessary to include suitable safety measures such as a safety gate 90 hinged to the tank 16 at hinge 92 to help prevent personnel or objects coming too close or falling against the tanks 42, 56. For interchange of the tanks 42, 56, the gate 90 may be opened, and one or the tanks 42, 56 removed and exchanged for the other. The tanks 42, 56 may be secured on the skid 12 by any suitable means such as bolts.

Evaporated water from evaporation tanks 42, 56 may be provided through condenser 78. The condenser 78 may comprise a peaked steam hood placed above the evaporation tank 42, 56, whichever is used, at locations 86, 88 respectively, leaving an air space to avoid pressurization. The hood of the condenser 78 has a handle 80 and is hinged on one side with hinges 81 that allow the hood to be fully opened if steam recovery is not desired. A condensation tube 82 runs from the condenser 78 to clean water recovery tank 20, and is provided with an electric fan 84 that may be automatically controlled to be powered when the hood is lowered and the boil-off tank burner float low water level has been reached, according to the position of the float of float operated switch 40. The operation of the burner float operated switch 40 signals the fan 84 in the condenser 78 as the case may be, to be powered. The condensing tube 82 is preferably connected to and runs the length of the exterior of the hood of the condenser 78 to drain condensed water into the clean water tank 20. The tank 20 is used to collect and hold clean water readily available for reuse.

Apparatus 10 is provided with tanks large enough to handle the volumes of waste from for example a drilling rig, while still being deliverable and functional in isolation to any site including remotes. The tank 14 functions as both a containment tank and starting point of the separation process, where solids separation begins. Wastewater in the drilling sector varies greatly from traditionally defined wastewater in that it contains many heavy solids that would not normally be present in other situations where water treatment is desired. These heavy solids include such materials as sand, sawdust, clay and gravel. The graduated bottom plates 22, 24 and 26 cause heavy solids to settle out and be contained in tank 14. These heavy solids are dealt with at the end of the application by traditional disposal methods.

The apparatus also removes floating contaminants such as oil and diesel in the tank 14 while settling out solids and recovers these floating contaminants for re-use or traditional disposal methods. Transitional fluids (fluids that are lighter than settled solids but heavier than any remaining floating contaminants) are delivered to the tank 16 through piping 32. Tank 16 may be operated as a floe compartment in which a flocculant may or may not be added depending on the initial constituents of the wastewater being treated. Clarified water from the tank 16 is then transferred by way of feed pump in conduit system 36 to tank 18. When tank 18 is provided for summer operation, exhaust gases from a burner are used to boil water and are exhausted to the atmosphere. For winter operation, i.e. extreme cold temperature operation, a tank such as tank 56 is provided, in which a series of steam lines 58 pass directly through the fluid. The steam supply 70 is initially run through the tanks 14 and 16 for pre-heating of fluids and after running through the tank 18 continues through the water recovery tank 20 to keep recovered water from freezing.

Tanks 42 and 56 are interchangeable in apparatus 10 to allow for fuel efficiency and temperature requirements depending on the operator's situation. Both tanks 42 and 56 may be fitted with condenser 78 for recovery of clean water if desired, which is delivered to clean water recovery and holding tank 20.

Apparatus 10 reduces on-site volume of waste and recovers components of the waste. With an on-site system spill sites can be cleaned up and material recovered immediately, minimizing both loss of product and damage to the environment. In addition, waste water may be treated seasonally, by providing the apparatus 10 with one of a warm weather evaporation tank and a cold weather evaporation tank; and interchanging the warm weather evaporation tank with the cold weather evaporation tank when desirable due to weather conditions. The terms "warm" and "cold" are defined relative to each other, that is, the summer tank is intended for warmer conditions than the winter tank.

In the claims, the word "comprising" is used in its inclusive sense and does not exclude other elements being present. The indefinite article "a" before a claim feature does not exclude more than one of the feature being present.

Immaterial modifications may be made to the embodiments described here without departing from what is covered by the claims.

We claim:

1. A waste water treatment system, comprising:
   a platform supporting a structure having first and second ends and first and second opposing walls;
   a first tank mounted on said platform at the first end of the structure, the first tank defined by the first and second opposing walls and a third wall opposite the first end, said first tank receiving waste water;
   a second tank mounted on said platform defined by the first and second opposing walls and the third wall and a fourth wall opposite the third wall,
   a flow line mounted at a high level from said first tank to said second tank;
   an evaporation tank mounted on said platform, defined by the first and second opposing walls and the fourth wall, said evaporation tank heated by exhaust gas from a fuel burner positioned for heating liquid in the evaporation tank; and
   a conduit system using a float operated switch to allow water to flow from said second tank to said evaporation tank.

2. The waste water treatment system of claim 1, wherein said first tank comprises first and second compartments.

3. The waste water treatment system of claim 2, wherein solids are removed from waste water moving from the first compartment to the second compartment.

4. The waste water treatment system of claim 3 wherein said fuel burner is a diesel burner.

5. The waste water treatment system of claim 4 wherein said burner is supported on said platform by legs.

6. The waste water treatment system of claim 5 wherein said exhaust from said burner enters exhaust piping, said exhaust piping passing through said evaporation tank.

7. The waste water treatment system of claim 6 wherein said exhaust gases exit at an exhaust manifold.

8. The waste water system of claim 7 wherein said float operated switch is located in said second tank, said float operated actuating a pump when a water level in the transitional tank is reached.

9. The waste water system of claim 8, further comprising a second float operated switch in said evaporation tank, said second float operated switch turning off said pump when a water level in the evaporation tank is reached.

10. The waste water system of claim 9, further comprising a third float operated switch in said evaporation tank, said third float operated switch actuating said burner when a second water level in the evaporation tank is reached, the second water level in said evaporation tank being lower than said first water level in said evaporation tank.

11. The waste water system of claim 10 further comprising a safety gate to prevent personnel from coming too close to said evaporation tank.

12. A waste water treatment system, comprising:
    a platform supporting a structure having first and second ends and first and second opposing walls;
    a first tank mounted on said platform at the first end of the structure, the first tank defined by the first and second opposing walls and a third wall opposite the first end, said first tank receiving waste water;
    a second tank mounted on said platform defined by the first and second opposing walls and the third wall and a fourth wall opposite the third wall,
    a flow line mounted at a high level from said first tank to said second tank;
    an evaporation tank mounted on said platform defined by the first and second opposing walls and the fourth wall, said evaporation tank heated by exhaust gas from a diesel burner positioned for heating liquid in the evaporation tank; and
    a conduit system using a float operated switch to allow water to flow from said second tank to said evaporation tank.

* * * * *